United States Patent [19]

Anderson et al.

[11] 4,229,113
[45] Oct. 21, 1980

[54] SHARED DOCUMENT FEED STATION

[76] Inventors: Theodore H. Anderson, R.R. #1; Wallace E. Beuch, R.R. #2, both of Pine Island, Minn. 55963; Richard E. Lagergren, R.R. #1, Rochester, Minn. 55901

[21] Appl. No.: 948,860

[22] Filed: Oct. 5, 1978

[51] Int. Cl.² .................................................. B41J 13/00
[52] U.S. Cl. ................................... 400/596; 400/605; 400/606; 400/607; 400/608.1; 400/608.4; 226/115
[58] Field of Search ............. 400/596, 600.3, 605, 400/606, 607, 607.2, 607.3, 608.1, 608.2, 608.4; 271/258-261; 226/108-110, 115; 101/93.31, 99, 224, 287

[56] References Cited

U.S. PATENT DOCUMENTS

| | | | |
|---|---|---|---|
| 954,911 | 4/1910 | Barnard | 400/607.2 |
| 1,614,540 | 1/1927 | Shipley | 101/224 |
| 2,279,858 | 4/1942 | Breitling et al. | 101/99 X |
| 2,318,020 | 5/1943 | Sherman et al. | 400/608.4 |
| 3,176,819 | 4/1965 | Bloom, Jr. et al. | 400/605 X |
| 3,598,396 | 8/1971 | Andrews | 271/9 |
| 3,724,366 | 4/1973 | Murthy et al. | 101/93.31 |
| 3,966,037 | 6/1976 | Zambolin | 400/608.1 X |
| 3,995,730 | 12/1976 | Kwan et al. | 101/287 X |
| 4,074,797 | 2/1978 | Lewis et al. | 400/608.4 X |
| 4,109,779 | 8/1978 | Bauer et al. | 400/608.4 X |

Primary Examiner—Eugene H. Eickholt
Attorney, Agent, or Firm—Richards, Harris & Medlock

[57] ABSTRACT

A shared document feed station includes a common drive mechanism for normally advancing a receipt tape through a receipt tape zone and for selective operation to advance an alternative document through an alternative document zone. Document detectors sense the presence of a document in the alternative document zone and function to inhibit the drive mechanism from advancing the receipt tape while enabling the advance of the alternative document.

16 Claims, 10 Drawing Figures

SHARED DOCUMENT FEED STATION

DESCRIPTION

BACKGROUND AND SUMMARY OF THE INVENTION

This invention relates to a shared document feed station, and more particularly to a document feeding system for the printer of a point of sale terminal.

In the past, retail stores and similar businesses had utilized cash registers to record customer transactions. Modern cash registers function to provide both a journal tape and a receipt tape. The journal tape records every transaction that is entered upon a particular cash register for subsequent use in various accounting and management operations. Conversely, the receipt tape records individual transactions, with sequential sections of the receipt tape being torn away and handed to the customer following each transaction. While receipt tapes are adequate for relatively uncomplicated cash transactions, they have never been considered adequate for relatively complicated transactions such as charge sales, sales of items from different departments, sales of items necessitating the recordation of serial numbers, stock numbers, or the like, etc. Such transactions have therefore typically involved the manual completion of one or more documents, either in addition to or in lieu of a cash register entry.

Point of sale terminals are now widely used in place of traditional cash registers for recording customer transactions. A primary purpose behind the use of a point of sale terminal instead of a cash register is to facilitate the capture of a considerably greater amount of and considerably more detailed data concerning customer transactions than is possible with cash registers. Another purpose is to automate and simplify the heretofore manual operations that are involved in relatively complicated customer transactions.

While some point of sale terminals function to prepare the same document regardless of what type of customer transaction is involved, it is considered more desirable to provide the traditional receipt tape for cash transactions and to provide an alternative type of document, such as a cut form, multipart document, etc., for relatively complicated transactions such as charge sales, and the like. It would of course be possible to provide a separate printing mechanism for each type of document to be utilized in a point of sale terminal. However, such an apparatus would be unduly expensive, cumbersome and complicated to operate.

The present invention comprises a printing mechanism for a point of sale terminal wherein all of the various documents that are prepared in the terminal are printed by the same apparatus. In accordance with the broader aspects of the invention, a printing mechanism is utilized to effect printing along a printing path. Apparatus is provided for selectively advancing either a receipt tape through a receipt tape zone extending transversely to the printing path or for advancing an alternative document through an alternative document zone extending transversely to the printing path and overlying the receipt tape zone. Detectors are provided for sensing the insertion of an alternative document into the alternative document zone and for thereafter causing the document advancing mechanism to advance the alternative document instead of the receipt tape.

In accordance with more specific aspects of the invention, the document advancing mechanism includes a drive shaft. A first set of rollers receives the receipt tape therebetween and includes a roller mounted on the drive shaft and actuated through a one way clutch to advance the receipt tape whenever the drive shaft is rotated in a first direction. The alternative document is advanced by sets of rollers mounted on opposite sides of the receipt tape advancing rollers and each including a roller mounted on the drive shaft for advancing the alternative document when the drive shaft is rotated in the opposite direction.

In accordance with still other aspects of the invention, the alternative document zone extends laterally beyond the receipt tape zone. The document detectors are mounted in a portion of the alternative document zone extending laterally beyond the receipt tape zone and on opposite sides of the printing path. One of the detectors comprises a lever mounted for actuation by the insertion of an alternative document into the alternative document zone. The other detector comprises a photoelectric apparatus for detecting the presence of a document in the alternative document zone.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
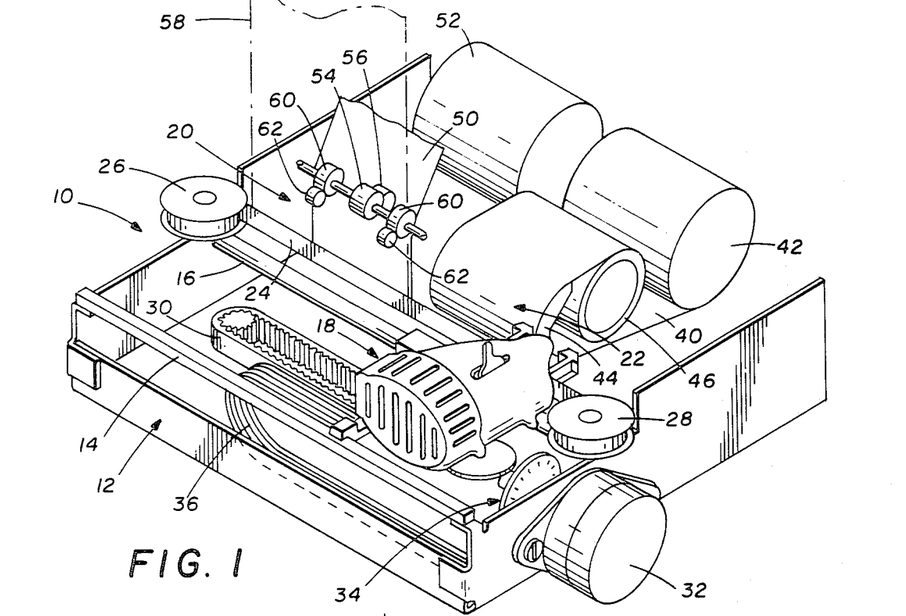
FIG. 1 is a perspective view of a shared document feed station incorporating the invention.

Referring now to the Drawings, and particularly to FIG. 1, there is shown an apparatus 10 comprising a shared document feed station incorporating the present invention. The apparatus 10 includes a frame 12, only portions of which are shown. The frame 12 includes a rectangular bar 14 and a round bar 16 which cooperate to support a print head 18 for lateral movement across the apparatus 10.

Those skilled in the art will appreciate the fact that virtually any conventional type of printing mechanism may be utilized in the practice of the present invention. The particular print head 18 shown in FIG. 1 comprises a seven wire dot matrix printer which is moved laterally across the apparatus 10 to effect printing both in a left-hand printing area 20 and in a right-hand printing area 22. A ribbon 24 extends from a spool 26 to a spool 28 for actuation by the print wires comprising the print head 18 to effect printing both in the left-hand printing area 20 and in the right-hand printing area 22.

The positioning of the print head 18 is controlled by a toothed belt 30 which is driven by a motor 32 mounted on frame 12. Information concerning the positioning of the print head 18 is generated by a disc 34 and is directed to conventional logic circuitry associated with the apparatus 10. The print head 18 is actuated by the associated logic circuitry through a ribbon cable 36 extending from the logic circuitry to the print head 18.

In the practice of the invention, the apparatus 10 may be utilized in a point of sale terminal. In such instances, the right-hand print area 22 is utilized to prepare a journal tape. A length of paper tape 40 extends from a supply roll 42 around a platen 44 to a take-up spool 46. The print head is actuated to record each operation of the point of sale terminal on the length of paper tape 40 thereby preparing a journal tape. At convenient intervals, for example, at the conclusion of each shift, the journal tape is removed from the take-up spool 46 for use by accounting and/or management personnel.

In the use of the apparatus 10 in a point of sale terminal, the left-hand printing area 20 is utilized in the preparation of receipt tapes. A length of paper tape 50 extends from a supply roll 52 around the platen 44 and between a drive roller 54 and a pinch roller 56. Certain types of transactions occurring at the point of sale terminal, for example, cash transactions and the like, are recorded on the length of paper tape 50 by the print head 18 to prepare a receipt tape. Unlike the journal tape, the receipt tapes are not accumulated on a take-up spool. Instead, sequential segments of the length of paper tape 50 each bearing data relating to a particular transaction are torn away and are given away to the customer as a memorandum of the transaction.

A unique feature of the present invention comprises the fact that in addition to preparing receipt tapes, the left-hand printing area 20 of the apparatus 10 is utilized in the preparation of alternative documents 58. Such documents may comprise memoranda of charge transactions, checks or other documents tendered in lieu of cash, and various other types of documents.

As will become more apparent hereinafter, an alternative document 58 may be inserted into the left-hand printing area 20 either from below or laterally, that is, from left to right in FIG. 1, and is received between drive rollers 60 and pinch rollers 62. When an alternative document 58 is properly positioned in the left hand printing zone 20 of the apparatus 10, the print head 18 effects printing on the alternative document in lieu of printing on the length of paper tape 50.

Figure 2:
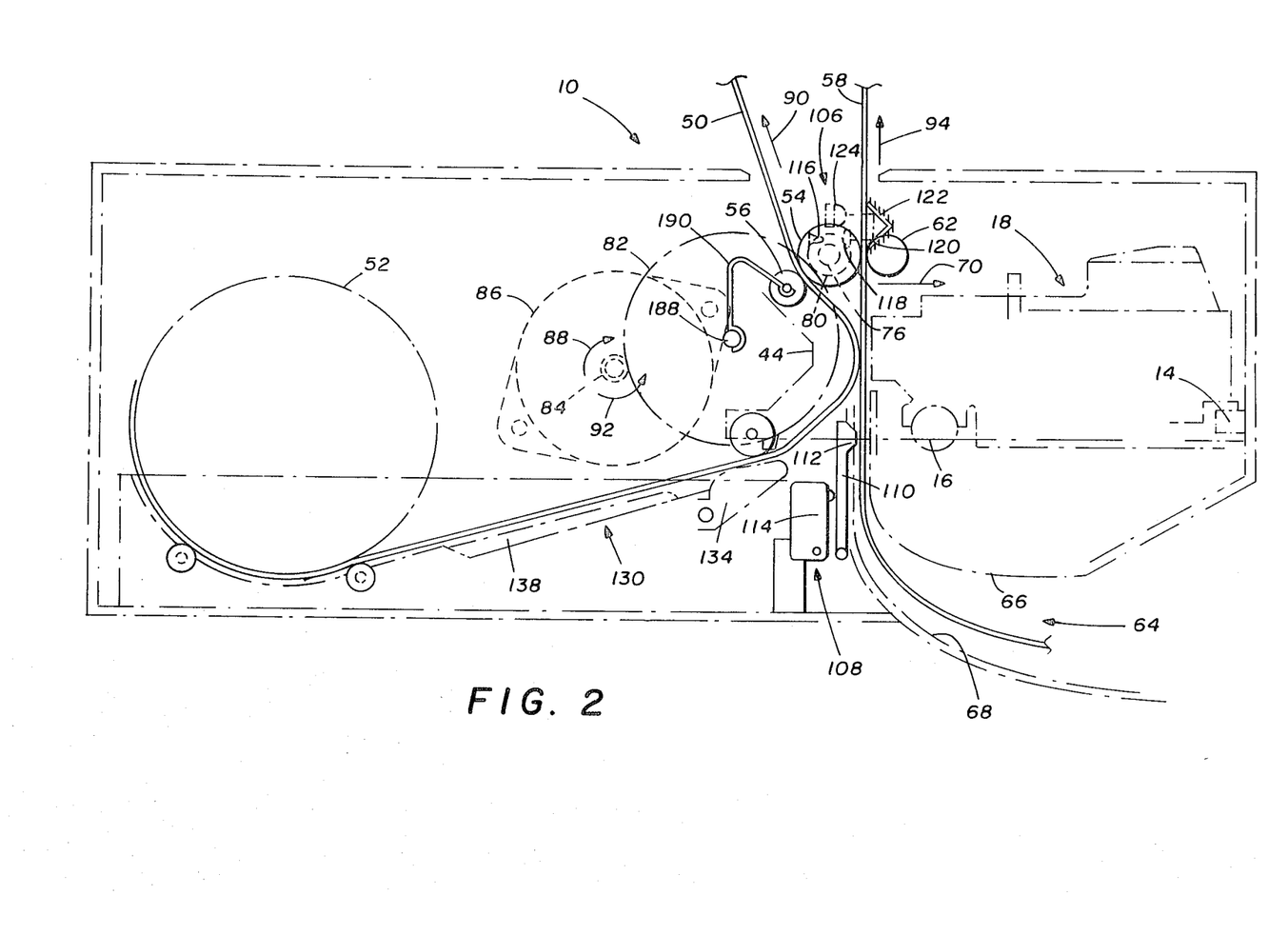
FIG. 2 is a left side view of the apparatus of FIG. 1 in which certain parts have been omitted and certain other parts have been shown diagrammatically to facilitate an understanding of the invention.

Referring to FIG. 2, the positioning of the length of paper tape 50 and the alternative document 58 with respect to the platen 44 and the print head 18 is shown in greater detail. The alternative document 58 may be inserted upwardly through a channel 64 defined by walls 66 and 68. Alternatively, the pinch rollers 62 may be pivoted outwardly in the direction of the arrow 70 to permit lateral insertion of the alternative document 58. When the alternative document 58 is properly positioned, it overlies the length of paper tape 50 so that the print head 18 prints on the alternative document 58 instead of on the length of paper tape 50.

Figures 3, 5:
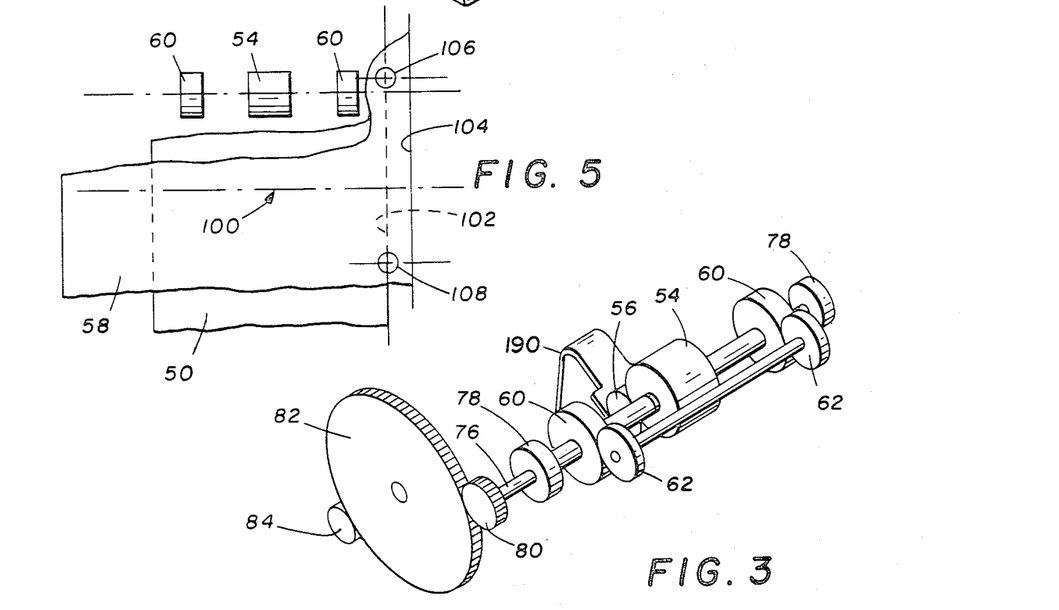
FIG. 3 is a perspective view illustrating the document advancing mechanism of the apparatus of FIG. 1.
FIG. 5 is an illustration of the document detection system of the apparatus of FIG. 1.
Figure 4:
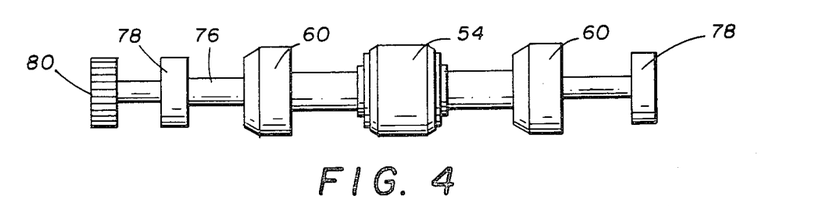
FIG. 4 is a front view of the drive shaft of the mechanism of FIG. 3.

Referring now to FIGS. 3 and 4 in conjunction with FIG. 2, the drive rollers 54 and 60 are mounted on a common drive shaft 76. The drive shaft 76 is rotatably supported by bushings 78 and extends to a gear 80 mounted in mesh with a gear 82. The gear 82 is in turn mounted in mesh with a pinion 84 driven by a stepper motor 86.

The drive roller 54 includes a one way clutch. Therefore, upon actuation of the stepper motor 86 to rotate the pinion 84 in the clockwise direction as indicated by the arrow 88 in FIG. 2, the drive roller 54 functions in cooperation with the pinch roller 56 to move the paper tape 50 upwardly in direction of the arrow 90. Conversely, when the stepper motor 86 is actuated to rotate the pinion 84 and therefore the drive shaft 76 counterclockwise as indicated by the arrow 92 in FIG. 2, the drive roller 54 remains stationary and the drive rollers 60 function in cooperation with the pinch rollers 62 to move the alternative document 58 upwardly as indicated by the arrow 94. The use of a common drive shaft to advance either the receipt tape or the alternative document, depending on the direction of rotation of the drive shaft, comprises an important feature of the present invention.

Referring to FIGS. 1 and 5, the print head 18 and the ribbon 24 function to effect printing along a printing path 100. The drive roller 54 functions to advance the length of paper tape 50 through a receipt tape zone defined by a right-hand edge 102. The receipt tape zone extends transversely with respect to and includes the printing path 100. The drive rollers 60 function to advance an alternative document 58 through an alternative document zone defined by a right-hand edge 104. The alternative document zone also extends transversely to and includes the printing path 100. Even though document 58 extends both to the right and to the left of tape 50, print head 18 is normally restricted to producing actual characters only within the width occupied by tape 50, in the particular machine being described.

An upper document detector 106 and a lower document detector 108 are provided for detecting the presence of a document in the alternative document zone. The positioning of the detectors 106 and 108 is within the alternative document zone, on opposite sides of the printing path 100. Receipt tape 50 passes partially underneath both of the detectors, but the detectors may overlie the receipt tape zone completely, partially or not at all.

When the detectors 106 and 108 are actuated to indicate that an alternative document 58 is present within the alternative document zone, the stepper motor 86 is actuated for counterclockwise rotation of the drive shaft 76 so that the drive rollers 60 and the pinch rollers 62 function to advance the alternative document 58. Conversely, when the detectors 106 and 108 do not detect the presence of an alternative document 58 in the alternative document zone, the stepper motor 86 is actuated to effect clockwise rotation of the drive shaft 76 so that the drive roller 54 and the pinch roller 56 advance the length of paper tape 50 through the receipt tape zone.

Figure 6:
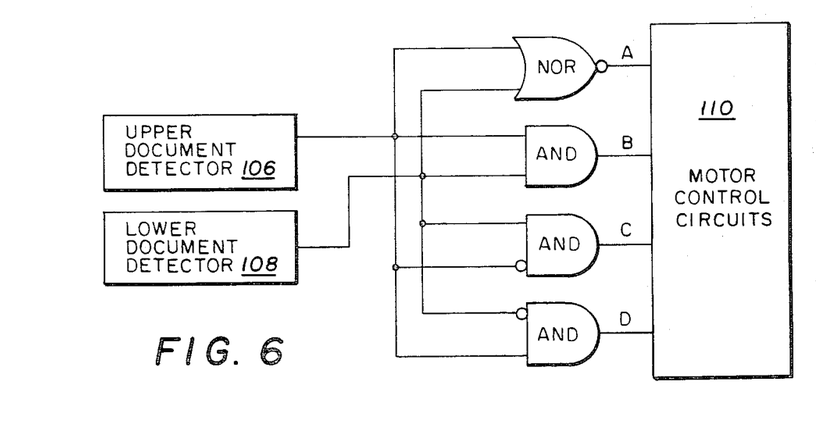
FIG. 6 is a schematic view of a portion of the logic system of the apparatus of FIG. 1.

As will be best understood by reference to FIG. 6, the detectors 106 and 108 function in conjunction with the logic circuitry of the apparatus 10 to generate a variety of outputs to conventional motor-control circuits 110. Thus, if neither detector senses the presence of a document in the alternative document zone, output A is generated. Output A causes the stepper motor 86 to effect clockwise rotation of the drive shaft 76, so that the drive roller 54 and the pinch roller 56 function to advance the paper tape 50 through the receipt tape zone. Output A therefore comprises a valid output in the case of a transaction calling for printing on the paper tape 50 to provide a receipt tape, and comprises an invalid output in the case of a transaction calling for printing on an alternative document. Conversely, in those instances in which both the detector 106 and 108 detect the presence of a document in the alternative document zone, output B is generated. Output B causes the stepper motor 86 to effect counterclockwise rotation of the drive shaft 76 so that the drive rollers 60 and the pinch rollers 62 function to advance an alternative document through the alternative document zone. Output B is a valid output in those instances in which the transaction calls for printing on an alternative document and is an invalid output in those instances in which the transaction calls for printing on a receipt tape.

When an alternative document is inserted upwardly through the channel 64, the lower document detector 108 senses the leading edge of the document, at which time the stepper motor 86 is actuated counterclockwise by output C. As the document is inserted further, it is received by the rollers 60 and 62 which advance the document until it is sensed by the detector 106. When the lower edge of the alternative document has passed beyond lower detector 108, output D continues the advancement of the document until it has been fully ejected. During the printing of an alternative document, outputs C and D may also be used to indicate error conditions such as skewing of the document.

Referring to FIG. 2, lower document detector 108 comprises a pivotally supported lever 110 having a tip 112 extending into the alternative document zone. The tip 112 has camming surfaces facing both downwardly and laterally, and therefore is adapted for actuation by an alternative document inserted either from below through the channel 64 or laterally from left to right. Upon actuation, lever 110 actuates a switch 114 which produces an output indicative of the presence or absence of a document in the alternative document zone.

The upper document detector 106 comprises a light source 116, a lens 118, a pair of mirrors 120 and 122, and a photosensitive element 124. The light source 116, the lens 118 and the mirrors 120 and 122 function to direct a light beam back and forth across the alternative document zone, so that the photosensitive element 124 functions to produce an output indicative of the presence or absence of a document in the alternative document zone.

Figure 7:
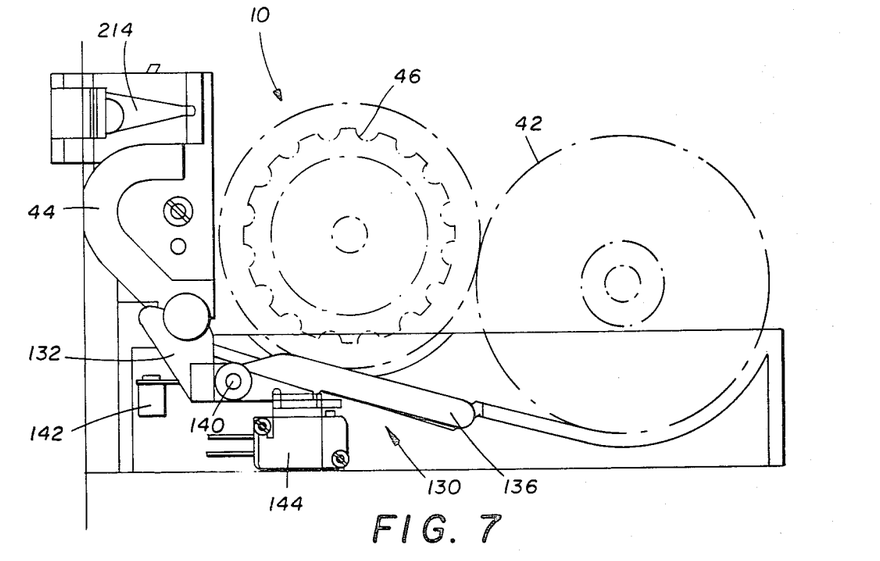
FIG. 7 is a right side view of the apparatus of FIG. 1 in which certain parts have been omitted and certain parts have been broken away more clearly to illustrate the invention.

Referring to FIGS. 2 and 7, the apparatus 10 further includes a mechanism 130 for detecting the condition of the paper tape on rolls 42, 46 and 52.

Mechanism 130 includes levers 132, 134, 136 and 138 which comprises a common mechanism which is pivotally supported on a shaft 140. The mass of these levers is counterbalanced by a weight 142. Upon actuation, the levers 132, 134, 136 and 138 function to actuate a single switch 144 which serves to terminate operation of the apparatus 10 when either of the rolls 42 or 52 is out of paper, or the journal take-up spool 46 becomes full.

Figure 8A:
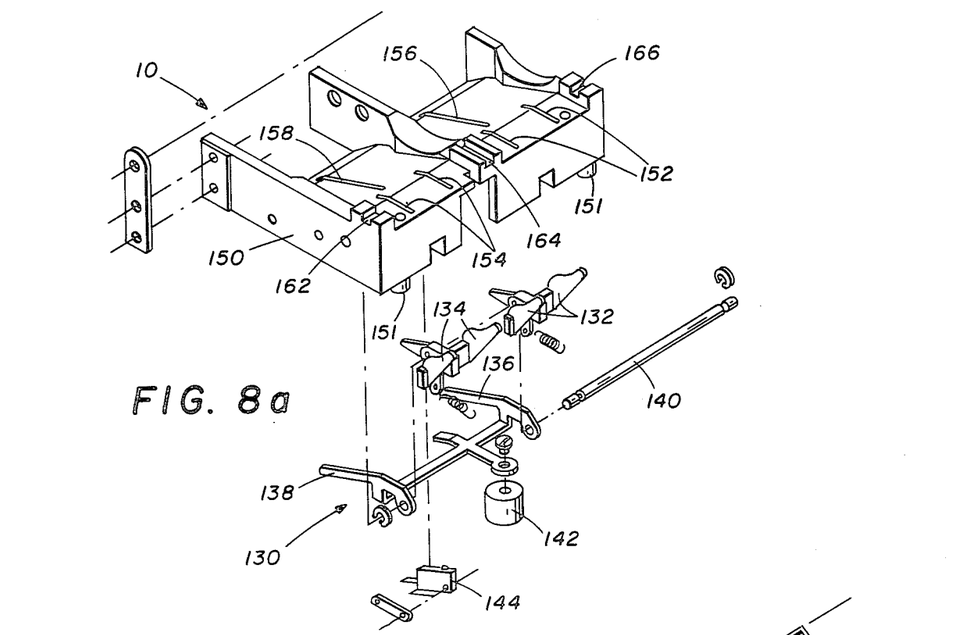
FIGS. 8a, 8b and 8c are exploded views of various portions of the apparatus of FIG. 1, respectively.
Figure 8B:
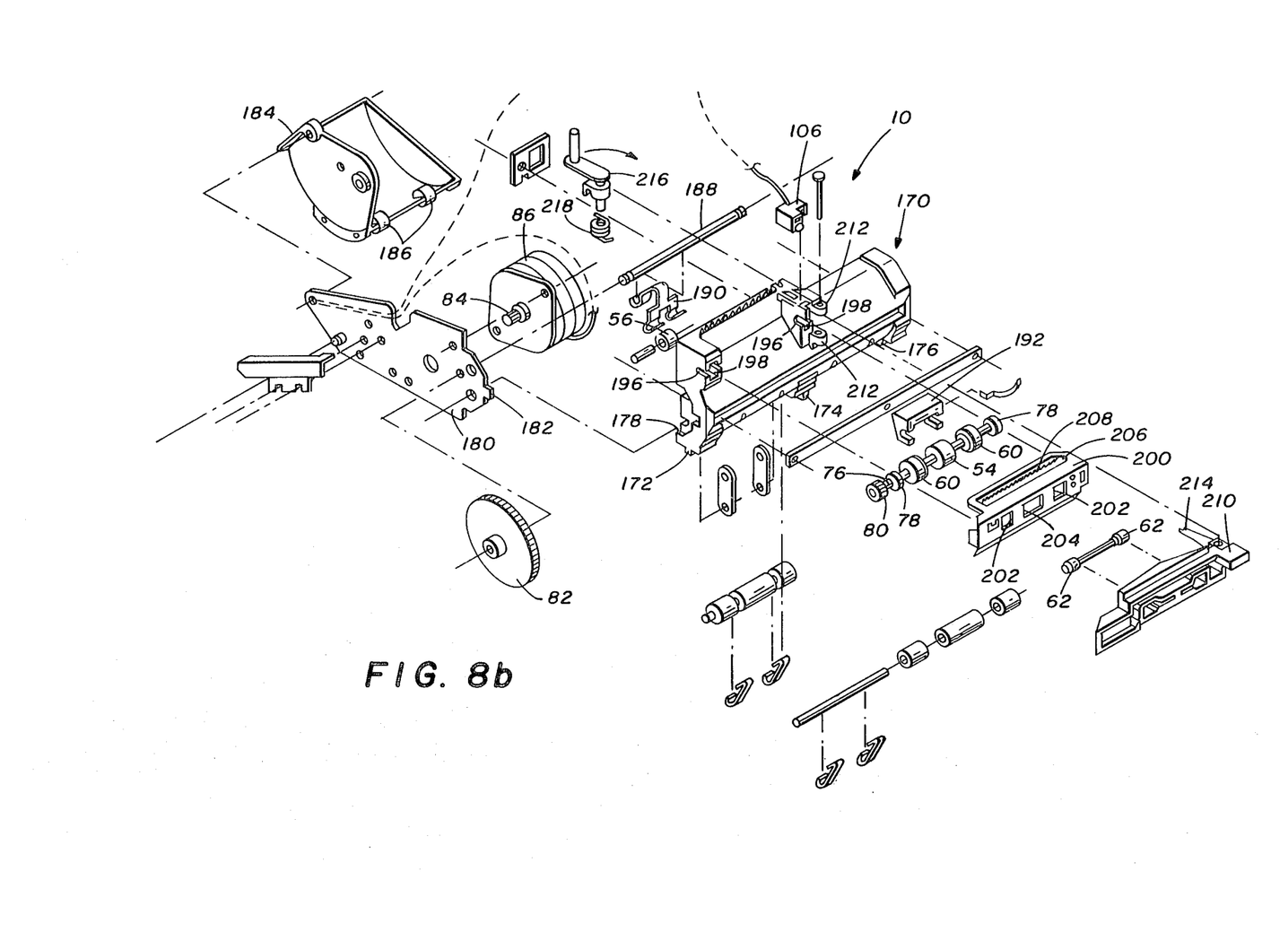
Figure 8C:
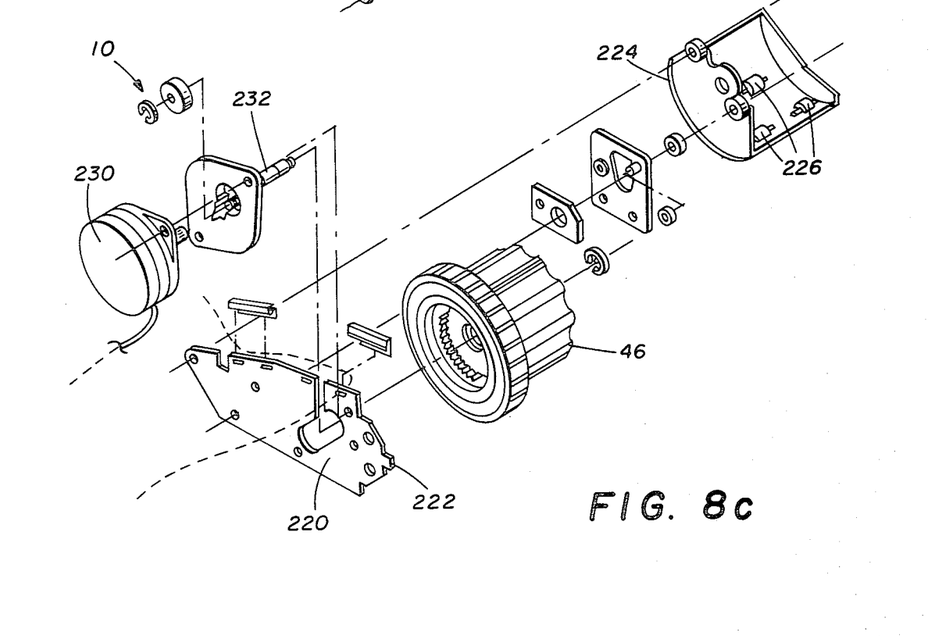

The construction of the apparatus 10 is shown in detail in FIGS. 8a, 8b, and 8c. Referring first to FIG. 8a, the apparatus 10 includes a base 150 having pins 151 depending therefrom for engagement with the base 12 to assure alignment of all of the components of the apparatus 10.

The base 150 has a plurality of slots 152, 154, 156 and 158 formed therein. The slots 152 receive the levers 132 of the mechanism 130. The slots 154 receive the levers 134, the slot 156 receives the lever 136, and the slot 158 receives the lever 138. The base 150 supports the shaft 140 which in turn supports the levers 132, 134, 136 and 138, together with the counterweight 142. The base 150 also supports the switch 144.

The base 150 has a plurality of platen locating slots 162, 164 and 166 formed therein. Referring to FIG. 8b, the apparatus 10 further includes a platen 170 having projections 172, 174 and 176 extending therefrom. In the assembly of the apparatus 10, the projections 172, 174 and 176 of the platen 170 are received in the slots 162, 164 and 166, respectively of the base 150 to precisely locate the platen 170 with respect to the base 150. In this manner, all of the component parts of the apparatus 10 are precisely and correctly aligned with respect to one another.

The platen 170 has locating recesses 178 formed in the opposite ends thereof. A side plate 180 has corresponding projections 182 extending therefrom whereby the side plate 180 is precisely located with respect to the platen 170. The side plate 180 supports a cradle 184 having rollers 186 rotatably supported thereon. The supply roll 52 is received in the cradle 184 and rotatably supported therein by the rollers 186.

The side plate 180 also supports the stepper motor 186. The stepper motor 86 drives the pinion 84 which in turn drives the gear 82. The gear 82 is rotatably supported on a shaft 188 extending between the side plate 180 and a corresponding side plate on the opposite side of the platen 170. A clip 190 is spring loaded against the shaft 188 and in turn supports the pinch roller 56.

A brake member 192 is positioned around the drive roller 54 and cooperates with the one way clutch thereof to prevent reverse movement of the paper tape 50 when the drive shaft 76 is rotated counterclockwise to advance an alternative document 58. The drive shaft 76 extends through slots 196 formed in the platen 170, which is also provided with cavities 198 which receive the bushings 78 of the drive shaft 76. The drive shaft 76 is retained by a plate 200 having apertures 202 formed therein for receiving the drive rollers 60 and an aperture 204 formed therein for receiving the drive roller 54.

The plate 200 is also provided with a slot 206 whereby the length of paper tape 50 exits from the receipt tape printing zone. The slot 206 is provided with saw tooth edges 208 on the forward side thereof. Similar saw teeth are molded into platen 170 to provide a rearward side for tape 50 to exit. These two sets of teeth allow the operator to tear off the tape in any direction.

The pinch rollers 62 are supported on a member 210 which is supported between bosses 212 of the platen 170 for pivotal movement providing vertical axis. A lever 214 extends rearwardly and engages a handle 216. A torsion spring 218 operates through the handle 216 and the member 210 to normally engage the pinch rollers 62 with the drive rollers 60. The handle 216 is manually operable against the action of the spring 218 to pivot the member 210 forwardly, thereby disengaging the pinch rollers 62 from the drive rollers 60 to permit the lateral insertion of an alternative document 58 between the drive rollers 60 and the pinch rollers 62.

Referring to FIG. 8c, a side plate 220 mounts on the opposite side of the platen 170 from the side plate 180. The side plate 220 has a projection 222 which is received in a cavity 178 formed in the platen 170 which precisely locates the side plate 220. A cradle 224 has a plurality of rollers 226 rotatably supported thereon. The supply roll 42 is received in the cradle 224 and rotatably supported therein by the rollers 226.

The side plate 220 also supports a stepper motor 230. The stepper motor 230 drives the take-up spool 46, which is rotatably supported on a shaft 232. In this manner the stepper motor 230 functions to advance the paper tape 40 through the right-hand print area 22 of the apparatus 10.

Operation

In the operation of the apparatus 10, the supply roll 42 is positioned in the cradle 224 and the supply roll 52 is positioned in the cradle 184. The length of paper tape 40 is extended from the supply roll 42 around the platen 44 and is engaged with the take-up spool 46. The length of paper tape 50 is extended from the supply roll 52 around the platen 44 and through the slot 206 of the plate 200. Thereafter, the print head 18 is actuated to print journal tape information on the length of tape 40 and to print receipt tape information on the length of paper tape 50.

In the event a particular transaction requires entries on an alternative document, the required document is positioned in the left-hand print area 20 of the apparatus 10. The document may be inserted from beneath through the slot 64. Alternatively, the handle 216 may be actuated to disengage the pinch rollers 62 from the drive rollers 60 to permit lateral insertion of the alternative document.

The stepper motor 86 is normally operated in a clockwise direction to advance the paper tape 50. When the detectors 106 and 108 detect the presence of an alternative document in the alternative document zone, the stepper motor 86 is actuated to rotate the drive shaft 76 counterclockwise. This causes the advance of the alternative document 58 through the alternative document zone while the length of paper tape 50 remains stationary in the receipt tape zone.

Although particular embodiments of the invention have been illustrated in the accompanying Drawings and described in the foregoing Detailed Description, it will be understood that the invention is not limited to the embodiments disclosed but is capable of numerous rearrangements, modifications and substitutions of parts and elements without departing from the spirit of the invention.

We claim as our invention:

1. A printing system comprising:
   means for effecting printing along a predetermined printing path;
   means for advancing a first document through a first printing zone extending across the printing path;
   means for advancing a second document through a second printing zone overlying the first printing zone and extending across the printing path;
   means for normally activating the first document advancing means and responsive to the presence of a document in the second printing zone for actuating the second document advancing means;
   the second printing zone extending laterally beyond the first printing zone; and
   first and second document detecting means located in the portion of the second printing zone extending beyond the first printing zone and on opposite sides of the printing path.

2. A printing system comprising:
   means for effecting printing along a predetermined printing path;
   means for advancing a first document through a first printing zone extending across the printing path;
   means for advancing a second document through a second printing zone overlying the first printing zone and extending across the printing path; and
   means for normally activating the first document advancing means and responsive to the presence of a document in the second printing zone for actuating the second document advancing means,
   the document advancing means comprising:
   a drive shaft;
   a first set of rollers including at least one roller mounted on the drive shaft for receiving a first document therebetween and responsive to rotation of the drive shaft in one direction to advance the first document through the first printing zone; and
   a second set of rollers including at least one roller mounted on the drive shaft for receiving a second document therebetween and responsive to rotation of the drive shaft in the opposite direction for advancing the second document through the second printing zone.

3. A printing system comprising:
   a printing mechanism for effecting printing along a printing path extending in a predetermined direction;
   means for positioning a first document in a first printing zone extending transversely across the printing path;
   means for positioning a second document in a second printing zone overlying the first printing zone and extending beyond the first printing zone in the predetermined direction;
   document sensing means positioned within the second printing zone adjacent to the first printing zone and on opposite sides of the printing path for detecting the presence of a document in the second printing zone; and
   means responsive to the document sensing means for selectively advancing either a first document through the first printing zone or a second document through the second printing zone.

4. The printing system according to claim 3 wherein the printing mechanism comprises a print head and means for moving the print head back and forth along the printing path.

5. The printing system according to claim 3 further characterized by:
   a drive shaft;
   a first set of rollers including a roller mounted on the drive shaft and having a one way clutch contained therein for receiving a first document therebetween and responsive to rotation of the drive shaft in a first direction for advancing the first document through the first printing zone; and
   two additional sets of rollers including rollers mounted on the drive shaft on opposite sides of the rollers comprising the first set of rollers for receiving a second document therebetween and responsive to rotation of the drive shaft in the opposite direction for advancing the second document through the second printing zone.

6. The printing system according to claim 3 wherein the document sensing means includes at least one lever having a portion extending into the path of a document positioned in the second printing zone and responsive to the positioning of a document in the second printing zone for generating a predetermined output.

7. The printing system according to claim 3 wherein the document sensing means includes means for directing a light beam across the second printing zone and responsive to the presence of a document in the second printing zone for generating a predetermined output.

8. In a printing system of the type including means for advancing a receipt tape through a receipt tape zone and a printing mechanism for effecting printing along a printing path extending across the receipt tape zone and thereby printing on the receipt tape, the improvement comprising:
   means for positioning an alternative document in a zone overlying the receipt tape zone and including the printing path so that the printing mechanism prints on the alternative document instead of the receipt tape;
   means responsive to the positioning of an alternative document to receive printing for advancing the alternative document with respect to the printing path;
   means for normally advancing the receipt tape in a predetermined direction extending transversely to the printing path; and
   means for selectively advancing the alternative document in the same predetermined direction, depending on the presence of an alternative document to receive printing.

9. The improvement according to claim 8 wherein the means for advancing the receipt tape comprises a drive shaft and a first pair of rollers including a roller mounted on the drive shaft for receiving the receipt tape and for advancing the receipt tape in response to rotation of the drive shaft in the first direction, and wherein the means for advancing the alternative document comprises at least one additional pair of rollers including a roller mounted on the drive shaft for receiving the alternative document therebetween and for advancing the alternative document in response to rotation of the drive shaft in the opposite direction.

10. In a printing system of the type including means for advancing a receipt tape through a receipt tape zone and a printing mechanism for effecting printing along a printing path extending across the receipt tape zone and thereby printing on the receipt tape, the improvement comprising:
   means for positioning an alternative document in a zone overlying the receipt tape zone and including the printing path so that the printing mechanism prints on the alternative document instead of the receipt tape; and
   means responsive to the positioning of an alternative document to receive printing for advancing the alternative document with respect to the printing path;
   the means responsive to the positioning of an alternative document to receive printing comprising first and second document detecting means positioned on opposite sides of the printing path.

11. The improvement according to claim 10 wherein one of the document detecting means comprises a lever including the portion positioned for actuation by an alternative document upon insertion thereof into position to receive printing.

12. The improvement according to claim 10 wherein one of the document detecting means includes means for directing a light beam across the path of an alternative document inserted to receive printing.

13. The printing system comprising:
   a print head;
   means for moving the print head along a printing path extending in a predetermined direction to effect printing along the printing path;
   means for positioning a receipt tape in a receipt tape zone extending transversely across the printing path so that the print head effects printing on the receipt tape;
   means for positioning an alternative document in an alternative document zone overlying the receipt tape zone and extending transversely across the printing path and laterally beyond at least one end of the receipt tape zone in the predetermined direction so that the print head effects printing on an alternative document instead of the receipt tape;
   first and second document detection means positioned on opposite sides of the printing path adjacent the receipt tape zone for detecting the presence of a document in the alternative document zone and for producing a predetermined output; and
   document advancing means for selectively advancing either the receipt tape through the the receipt tape zone or the alternative document through the alternative document zone depending on the output of the detection means.

14. The printing system according to claim 13 wherein the document advancing means comprises:
   a drive shaft;
   a first set of rollers including at least one roller mounted on the drive shaft for advancing the receipt tape through the receipt tape zone in response to rotation of the drive shaft in a first predetermined direction; and
   at least one additional pair of rollers including a roller mounted on the drive shaft for advancing the alternative document through the alternative document zone in response to rotation of the drive shaft in the opposite direction.

15. The printing system according to claim 13 wherein one of the document detection means comprises a lever including a portion normally positioned in the portion of the alternative document zone extending laterally beyond the receipt tape zone for actuation by a document inserted into the alternative document zone.

16. The printing system according to claim 13 wherein one of the document detection means comprises means for directing a light beam through the portion of the alternative document zone extending laterally beyond the receipt tape zone, and means responsive to the light beam for indicating the presence of a document in the alternative document zone.

* * * * *

UNITED STATES PATENT AND TRADEMARK OFFICE
CERTIFICATE OF CORRECTION

PATENT NO. : 4,229,113
DATED : October 21, 1980
INVENTOR(S) : Theodore H. Anderson et al.

It is certified that error appears in the above—identified patent and that said Letters Patent is hereby corrected as shown below:

On The Title Page Insert:

-- (73) Assignee: International Business Machine Corporation, Armonk, N. Y. --.

Signed and Sealed this

Fourteenth Day of April 1981

[SEAL]

Attest:

RENE D. TEGTMEYER

Attesting Officer     Acting Commissioner of Patents and Trademarks